(No Model.)

T. A. HIGHTOWER.
FERTILIZER DISTRIBUTER.

No. 469,245. Patented Feb. 23, 1892.

Witnesses:
J. B. McGirr.
J. S. Barker.

Inventor:
Thomas Arnold Hightower
Mr. Charles & William B. King
Attys.

United States Patent Office.

THOMAS ARNOLD HIGHTOWER, OF HEIDELBERG, MISSISSIPPI.

FERTILIZER-DISTRIBUTER.

SPECIFICATION forming part of Letters Patent No. 469,245, dated February 23, 1892.

Application filed October 27, 1891. Serial No. 409,989. (No model.)

*To all whom it may concern:*

Be it known that I, THOMAS ARNOLD HIGHTOWER, a citizen of the United States, residing at Heidelberg, in the county of Jasper and State of Mississippi, have invented certain new and useful Improvements in Fertilizer-Distributers; and I do hereby declare the following to be a full, clear, and exact description of the invention, such as will enable others skilled in the art to which it appertains to make and use the same.

My invention has for its object to improve machines used for the distribution of commercial fertilizers; and it consists in the improvements in the several features thereof to be hereinafter pointed out.

Figure 1:
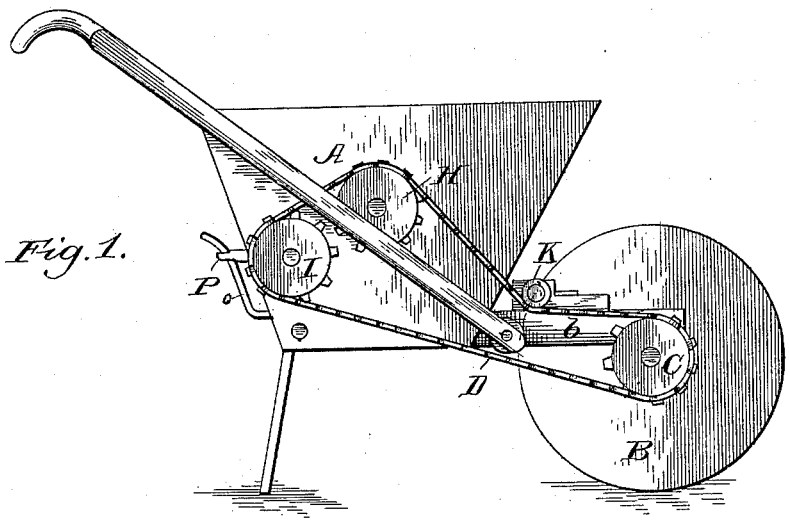
Figure 2:
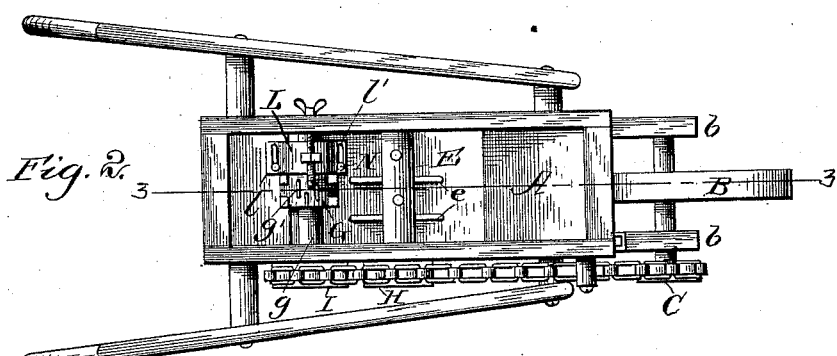
Figure 3:
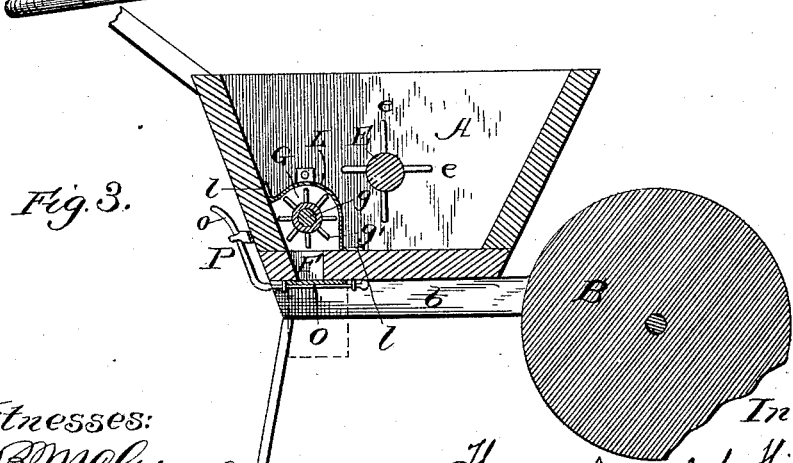

Figure 1 is a side view of a machine embodying my invention. Fig. 2 is a top view thereof. Fig. 3 is a vertical longitudinal section on the line 3 3 of Fig. 2.

In the drawings, A represents the hopper or box into which the fertilizer is placed for distribution, and which may be of any usual or preferred construction and size.

B designates the ground-wheel, which is journaled in the side pieces b, that project forward from the hopper.

On one end of the axle of the wheel B is a belt or sprocket wheel C, and with this wheel engages a belt or chain D, which drives the various moving parts of the machine.

E is the stirrer mounted within the hopper and consisting of a shaft, from which project a number of pins or blades e, these latter being arranged so that as the shaft revolves the blades e do not follow one directly after the other in the same vertical plane, but rather operate to agitate the entire mass of fertilizer from side to side of the hopper, the blades being situated at different points along the shaft to accomplish this in a thorough manner.

In rear of the stirrer, and arranged over a hole F in the bottom of the hopper, substantially midway between the side walls thereof, is the feeder G, consisting of the shaft g and the blades g', which by preference have thin flat edges, and are made so that they may be easily removed from the shaft, so that more or less of them may be employed as the character of the fertilizer being operated upon demands for its proper distribution. These blades g' are so arranged that as the shaft on which they are mounted revolves those which successively pass a given line parallel with the axis of the shaft travel in different paths, and also so that the flat edges of the blades which travel in paths that are adjacent or side by side overlap or have their side edges come opposite to each other. This construction insures that the feeder shall act upon the material throughout the entire width of the feeder, and is a very important feature in a machine adapted for the feeding of commercial fertilizers, which are apt to be of a sticky or gummy consistency. When a substance of this character is acted upon by a feeder in which the blades are arranged to follow each other in the same or even in several paths, and these paths are separated by intervening spaces, the blades will plow channels through the fertilizer, but will not so uniformly feed the entire mass thereof as with a feeder constructed according to my invention.

H is a sprocket or belt wheel on the end of the shaft of the stirrer, and I is a similar wheel on the end of the shaft of the feeder, these wheels being driven by the chain or belt D.

K is a belt-tightener arranged to bear upon the belt between the wheels C and H, it being mounted adjustably upon one of the pieces b.

In order that the amount of fertilizer which this machine will feed may be regulated, I make use of an adjustable slide L, arranged over the feeder, and so that it may be moved to more or less contract the opening F in the bottom of the hopper. This adjustable slide consists of a curved plate of metal adapted to be moved by the adjusting-screw M, which projects through the outside wall of the hopper, either entirely to one side of or more or less over the feeder, the curve of the plate being such that when moved over the feeder the blades g' travel close to but do not touch the under face thereof. The ends of the plate l bear, respectively, upon the bottom and the rear end of the hopper, and are slotted at l' to allow the slide to be moved under the heads of the screws N, by which it is secured to the hopper.

O is a gate or valve pivoted to the under side of the hopper below the opening through which the fertilizer is fed. It is provided with a handle o, by which it is operated and which engages with a catch P, that operates to hold the valve in a closed position. The valve is ordinarily allowed to drop down, which it does by gravity, uncovering the opening F. When, however, it is desired to shut off the feed, the gate or valve is swung up to close the opening, the catch P engaging with the handle o and holding it closed. This valve is very useful in turning the machine at the ends of the field, where it is desirable the fertilizer should not be delivered, and effects a very considerable saving in the amount of material used.

A machine made according to my invention works in a very satisfactory manner, delivering the fertilizer in a thorough and perfect manner, while permitting the amount delivered to be regulated or the delivery to be entirely cut off.

What I claim is—

The combination of the hopper having the discharge-opening arranged substantially midway between the side walls thereof, the revolving feeder consisting of the shaft $g$ and the overlapping thin flat-edged blades $g'$, situated over the said opening, the adjustable slide L, which regulates the amount of material fed by the blades of the feeder, and consists of a curved plate adapted to be moved entirely to one side of the feeder-blades—that is, between them and the side wall of the hopper or more or less over the feeder—and the adjusting-screw M, projecting through the outside wall of the hopper and connected with the slide, substantially as set forth.

In testimony whereof I affix my signature in presence of two witnesses.

THOMAS ARNOLD HIGHTOWER.

Witnesses:
  NOAH L. HUDSON, Jr.,
  Q. C. HEIDELBERG.